United States Patent [19]
Yokota et al.

[11] Patent Number: 6,124,386
[45] Date of Patent: Sep. 26, 2000

[54] ETHYLENE-TETRAFLUOROETHYLENE COPOLYMER COMPOSITION

[75] Inventors: Masataka Yokota; Masao Umino, both of Kawasaki, Japan

[73] Assignee: Asahi Glass Company Ltd., Tokyo, Japan

[21] Appl. No.: 09/147,695

[22] PCT Filed: Jun. 16, 1998

[86] PCT No.: PCT/JP98/02637

§ 371 Date: Feb. 18, 1999

§ 102(e) Date: Feb. 18, 1999

[87] PCT Pub. No.: WO98/58018

PCT Pub. Date: Dec. 23, 1998

[30] Foreign Application Priority Data

Jun. 18, 1997 [JP] Japan ................................. 9-161612

[51] Int. Cl.[7] ...................................................... C08K 5/50
[52] U.S. Cl. ........................... 524/154; 524/236; 525/189
[58] Field of Search ..................... 524/154, 236; 525/189

[56] References Cited

U.S. PATENT DOCUMENTS 3,696,078  10/1972  Smith .
4,610,916  9/1986   Ballard .
5,281,643  1/1994   Natarajan .

OTHER PUBLICATIONS

Patent Abstracts of Japan, vol. 012, No. 103 (C–485), Apr. 5, 1988 (Apr. 5, 1988) & JP 62–232457 A (Dainippon Ink & Chem Inc), Oct. 12, 1987 (Oct. 12, 1987) *Abstract*.

Patent Abstracts of Japan, vol. 007, No. 007 (C–144), Jan. 12, 1983 (Jan. 12, 1983) & JP 57 164143 A (Nippon Mektron KK), Oct. 8, 1982 (Oct. 8, 1982) *Abstract*.

Patent Abstracts of Japan, vol. 1996, No. 06, Jun. 28, 1996 (Jun. 28, 1996) & JP 08 053592 A (Kureha Chem Ind Co Ltd), Feb. 27, 1996 (Feb. 27, 1996) *Abstract*.

*Primary Examiner*—David J. Buttner
*Attorney, Agent, or Firm*—Oblon, Spivak, McClelland, Maier & Neustadt, P.C.

[57] ABSTRACT

A composition which contains ETFE and PAS in a weight ratio of 5-95/5-95, and which further contains an organic onium compound in such a proportion that the weight ratio of the total amount of the above two component polymers and the organic onium compound is 80-99.99/0.01-20.

11 Claims, No Drawings

ETHYLENE-TETRAFLUOROETHYLENE COPOLYMER COMPOSITION

FIELD OF THE INVENTION

The present invention relates to an ethylene-tetrafluoroethylene copolymer composition excellent in mechanical properties.

DESCRIPTION OF THE BACKGROUND

An ethylene-tetrafluoroethylene copolymer (hereinafter referred to as ETFE) is excellent in heat resistance, flame retardancy, chemical resistance, weather resistance, low abrasion property and low dielectric property and is thus used in a wide range of fields including, for example, a heat resistant flame retarding coating material for electric wires, a corrosion resistant piping material for chemical plants, a material for greenhouses and a release coating material for kitchen utensils. However, it has had a problem that the intermolecular cohesion is weak, and the affinity with other polymers is poor, whereby it has been difficult to obtain a two component resin composition containing ETFE.

To improve the affinity of the fluorine-containing polymer with a polyolefin, it has been common to employ a method wherein the polyolefin is used as modified by an alkyl acrylate (JP-A-4-73459), or a method wherein a carbonyl group, a hydroxyl group or an epoxy group is incorporated to the fluorine-containing polymer (JP-A-62 -57448).

The former is effective when the fluorine-containing polymer is e.g. a vinylidene fluoride polymer or a vinyl fluoride polymer having a high polarity, but ETFE having low polarity is poor in the affinity, whereby it is difficult to obtain a good composition.

Whereas, the latter may, for example, be (1) a method of blending a fluorine-containing polymer with a non-fluorine type thermoplastic polymer having a functional group, (2) a method of incorporating polymer units based on a polymerizable monomer having a functional group to a fluorine-containing polymer, (3) a method of reacting reactive groups present in the fluorine-containing polymer, with a compound having a functional group or a compound capable of forming a functional group by a reaction, or (4) a method of modifying the fluorine-containing polymer by oxidation, hydrolysis or thermal decomposition.

However, with respect to ETFE, the method (1) is not effective since it has no affinity with a non-fluorine type thermoplastic polymer containing a functional group, the method (2) is not practical, since the monomer employed for the copolymerization reaction is limited and expensive, the method (3) can not be employed, since ETFE usually has no reactive group, and the method (4) is not suitable, since ETFE is stable, whereby it is difficult to form a carboxyl group, a hydroxyl group or an epoxy group by oxidation, hydrolysis or thermal decomposition.

Further, a thermoplastic composition excellent in the mechanical properties is known wherein a fluorine resin, a polyarylene thioether (hereinafter referred to as PAS) (a typical polymer is polyphenylene sulfide (hereinafter referred to as PPS)) and an aminoalkoxysilane are blended (JP-A-8-53592).

Further, a polymer alloy having good mechanical properties is disclosed wherein PPS, ETFE having a specific crystallizability and molecular weight, and an organic silane compound are blended (PCT/JP97/04146). Accordingly, when ETFE of common grade which is commonly used in the largest amount, is employed, it is impossible to obtain a composition having good mechanical properties.

SUMMARY OF THE INVENTION

The present invention provides a composition containing ETFE and PAS, which has excellent mechanical properties which can not be accomplished by the above prior art.

DETAILED DESCRIPTION OF THE PREFERRED EMBODIMENT

The present invention provides a composition which contains an ethylene-tetrafluoroethylene copolymer and a polyarylene thioether in a weight ratio of 5-95/5-95, and which further contains an organic onium compound in such a proportion that the weight ratio of the total amount of the above two component polymers and the organic onium compound is 80-99.99/0.01-20, and a composition which contains an ethylene-tetrafluoroethylene copolymer and a polyarylene thioether in a weight ratio of 5-95/5-95, and which further contains an organic onium compound and an organic silane compound, wherein the weight ratio of the total amount of the above two component polymers, the organic onium compound and the organic silane compound is 70-99.98/0.01-15/0.01-15.

As ETFE to be used in the present invention, one having ethylene and tetrafluoroethylene copolymerized in a ratio of from 70/30 to 30/70 (mol ratio), or one having such a monomer copolymerized with one or more other monomers such as fluoroolefins or hydrocarbon type olefins such as propylene, is, for example, preferred. More preferred ETFE is one having ethylene/tetrafluoroethylene/other monomers copolymerized in a molar ratio of 20-60/30-60/0-40, particularly 35-60/40-60/0-10. The melting point of such ETFE is substantially from 170 to 270° C.

As copolymerizable other monomers, various monomers may be used including, for example, α-olefins such as propylene and butene, fluoroolefins having hydrogen atoms on an unsaturated group, such as (perfluorobutyl)ethylene, vinyl ethers such as an alkyl vinyl ether and a (fluoroalkyl) vinyl ether, and (meth)acrylates such as a (fluoroalkyl) methacrylate and a (fluoroalkyl) acrylate. Further, a monomer having no hydrogen atom on a polymerizable unsaturated group, such as hexafluoropropylene or a perfluoro(alkyl vinyl ether) may also be used.

The molecular weight of ETFE is not particularly limited, and it is useful within a range from a low molecular weight product which is liquid at room temperature to a high molecular weight elastomer or a thermoplastic resin. Preferred is a polymer which is solid at room temperature, and one which is useful by itself as a thermoplastic resin or elastomer, is preferred. For the preparation of the polymer, any one of various conventional polymerization methods, such as bulk polymerization, suspension polymerization, emulsion polymerization or solution polymerization, may be employed.

PAS to be used in the present invention is one wherein the main repeating units are "—Ar—S—" (wherein Ar is an arylene group).

The arylene group "—Ar—" may, for example, be a p-phenylene group, a m-phenylene group, a o-phenylene group or a substituted phenylene group (wherein the substituent is an alkyl group, preferably a $C_{1-5}$ alkyl group or a phenyl group), a p,p'-diphenylenesulfonic group, a p,p'-biphenylene group, a p,p'-diphenylene ether group, a p,p'-diphenylenecarbonyl group, or a naphthylene group. 25 As typical PAS, PPS may be mentioned.

PPS to be used in the present invention is a polymer containing at least 70 mol %, preferably at least 80 mol %, of repeating units represented by the structural formula "—C$_6$H$_4$—S—" (wherein —C$_6$H$_4$— is a phenylene group). If the above repeating units are less than 70 mol %, the crystallinity as a characteristic of a crystalline polymer tends to be low, and the inherent physical properties of PPS tend to be impaired, such being undesirable.

From the method of its production, PPS is commonly known to be one (linear type) having a linear molecular structure and no branched or crosslinked structure or one (a crosslinked type) having a branched or crosslinked molecular structure. In the present invention, PPS obtained by any method for its production may be employed, but one of linear type is particularly preferred.

The melt viscosity of PPS to be used in the present invention is not particularly limited so long as a molded product can be obtained. However, from the viewpoint of the toughness of PPS itself, one having a melt viscosity of at least 100 poise at 300° C. is preferred, and from the viewpoint of the moldability, one with at most 50000 poise is preferred.

The organic onium compound to be used in the present invention is a conjugated acid of a Lewis base (such as an amine, a phosphine or a sulfide). Specifically, organic ammonium, organic arsonium, organic phosphonium, organic stibonium, organic aminophosphonium, organic phosphorane (such as triarylphosphorane), organic iminium and organic sulfonium compounds may be mentioned.

Preferably, a quaternary organic onium salt may be mentioned which is represented by the general formula ([QR$^1$R$^2$R$^3$R$^4$]$^+$)$_n$.x$^{-n}$ (wherein Q is a nitrogen atom, a phosphorus atom, an arsenic atom or an antimony atom, X is preferably a compound represented by an organic or inorganic anion (such as a halide, a sulfate, an acetate, a phosphate, a phosphonate, a hydroxide, an alkoxide, a phenoxide or bisphenoxide), n is equal to the valency of X, R$^1$, R$^2$, R$^3$ and R$^4$ which are the same or different, are selected from alkyl, aryl and alkenyl groups, and R$^1$, R$^2$, R$^3$ and R$^4$ may contain, as a substituent, a chlorine atom, a fluorine atom, a bromine atom, a cyano group, —OR, or a —COOR moiety (R is selected from the group consisting of C$_{1-20}$ alkyl groups, aryl groups, aralkyl groups and alkenyl groups). Particularly preferably, an organic ammonium compound (particularly a tetraorganoammonium halide) and an organic phosphonium compound (particularly a tetraorganophosphonium halide) are employed. Specifically, the following compounds may be mentioned.

Tetrabutylammonium chloride, tetrabutylammonium bromide, tetrabutylammonium hydrosulfate, tetrahexylammonium chloride, tetraheptylammonium chloride, tetrapentylammonium chloride, tributylallylphosphonium chloride, tributylbenzylphosphonium chloride, dibutyldiphenylphosphonium chloride, tetrabutylphosphonium chloride, tetrabutylphosphonium bromide, tributyl(2-methoxypropyl) phosphonium chloride, benzyltris(dimethylamino) phosphonium chloride, etc.

Further, 8-methyl-1,8-diazaobicyclo[5.4.0]undeca-7 enium chloride, 8-methyl-1,8-diazaobicyclo[5.4.0]undeca-7 enium bromide.

The proportions of ETFE and PPS are such that the weight ratio of the two is within a range of 5-95/5-95, preferably within a range of 20-90/10-80. Within this range, it is possible to obtain a two component resin composition having excellent properties. The content of the organic onium compound is such that the weight ratio of the total amount of the two component polymers of the above ETFE and PPS and the organic onium compound, is within a range of from 80-99.99/0.01-20, preferably within a range of from 90-99.9/0.1-10.

The organic silane compound to be used in the present invention is a compound having a hydrolyzable group bonded to a silicon atom, a compound having a non-hydrolyzable group bonded to a silicon atom, or a compound having a hydrolyzable group and a non-hydrolyzable group bonded to a silicon atom. Preferred is a compound having from zero to two non-hydrolyzable organic groups bonded to one silicon atom to which a hydrolyzable group is bonded, and it is more preferred that such organic groups are organic groups having functional groups.

The hydrolyzable group may, for example, be an alkoxyl group, an acyl group, a halogen atom such as a chlorine atom, or a hydrogen atom, particularly preferably an alkoxyl group having at most 4 carbon atoms. The non-hydrolyzable group having no functional group is preferably an alkyl group having at most 4 carbon atoms. Further, a partially hydrolyzed condensed product of such an organic silane compound may also be used as the organic silane compound. As the functional group, an amino group, an epoxy group, active chlorine, a mercapto group, an unsaturated group or a carboxyl group may, for example, be mentioned. Particularly preferred organic silane compounds include a tetraalkoxysilane, an organotrialkoxysilane, a diorganoalkoxysilane and organic silane compounds as their partially hydrolyzed condensed products. Specifically, the following compounds may be mentioned.

Tetramethoxysilane, tetraethoxysilane, tetrapropoxysilane, tetrabutoxysilane, trimethylmethoxysilane, trimethylethoxysilane, dimethyldimethoxysilane, dimethyldiethoxysilane, methyltrimethoxysilane, methyltriethoxysilane, methyldimethoxysilane, methyldiethoxysilane, dimethylethoxysilane, dimethylvinylmethoxysilane, dimethyldivinylethoxysilane, methylvinyldimethoxysilane, methylvinyldiethoxysilane, diphenyldimethoxysilane, phenyltrimethoxysilane, diphenyldiethoxysilane, phenyltriethoxysilane, vinyltrimethoxysilane, vinyltriethoxysilane, allyltrimethylsilane, ethynyltrimethylsilane.

Trimethylchlorosilane, dimethyldichlorosilane, methyltrichlorosilane, methyldichlorosilane, dimethylchlorosilane, dimethylvinylchlorosilane, methylvinyldichlorosilane, triphenylchlorosilane, methyldiphenylchlorosilane, diphenyldichlorosilane, methylphenyldichlorosilane, phenyltrichlorosilane, chloromethyldimethylchlorosilane, vinyltrichlorosilane, ethyltrichlorosilane.

γ-chloropropyltrimethoxysilane,
γ-chloropropylmethyldichlorosilane,
γ-chloropropyldimethyldimethoxysilane,
γ-chloropropylmethyldiethoxysilane,
γ-aminopropyltriethoxysilane, N-(β-aminoethyl)-γ-aminopropyltrimethoxysilane,
γ-aminopropyltrimethoxysilane, N-(β-aminoethy)-γ-aminopropylmethyldimethoxysilane,
γ-mercaptopropyltrimethoxysilane,
γ-glycidoxypropyltriethoxysilane,
γ-glycidoxypropylmethyldimethoxysilane,
γ-methacryloxypropyltrimethoxysilane,
γ-methacryloxypropylmethyldimethoxysilane,
γ-glycidoxypropylmethyldiethoxysilane,
γ-hydroxypropyltrimethoxysilane,
γ-iodopropyltrimethoxysilane,
γ-isocyanatepropyltriethoxysilane, γ-mercaptopropylmethyldimethoxysilane, N-phenyl-γ-aminopropyltrimethoxysilane.

N-trimethylsilylacetamide, trimethylsilyl (dimethylamine), trimethylsilyl(diethylamine), n-butyldimethylchlorosilane, t-butyldimethylchlorosilane, n-butyltrichlorosilane, i-butyltrimethoxysilane, n-butyltrimethoxysilane, chloromethyldimethylchlorosilane, chloromethylmethyldichlorosilane, chloromethyltrichlorosilane, chloromethyltrimethylsilane, n-decyltrichlorosilane, dimethyloctadecylchlorosilane, n-dodecyltrichlorosilane, n-dodecyltriethoxysilane, n-hexadecyltrichlorosilane, n-hexadecyltrimethoxysilane, n-hexyltrimethoxysilane, methacryloxymethyltrimethoxysilane, methylphenyldiethoxysilane, methylphenyldimethoxysilane, methyltriisopropoxysilane, 1-methoxy-1-(trimethylsiloxy)-2-methyl-1-propene, etc.

Further, one containing a plurality of silicon atoms in one molecule may also be employed, and 1,3-bis(γ-aminopropyl)-1,1,3,3-tetramethyldisiloxane, 1,3-bis(chloromethyl)-1,1,3,3-tetramethyldisiloxane, hexamethyldisilazane, N,N'-bis(trimethylsilyl)urea, N,N'-bis(trimethylsilyl)acetamide, N,N'-bis(trimethylsilyl)trifluoroacetamide, decamethylcyclopentasiloxane, decamethyltetrasiloxane, 3,3-diphenylhexamethyltrisiloxane, 1,3-divinyl-1,1,3,3-tetramethyldisiloxane or hexamethyldisiloxane may, for example, be mentioned.

The content of the organic silane compound is preferably such that the weight ratio of the total amount of the two component polymers of ETFE and PPS, the organic onium compound and the organic silane compound, is within a range of 70-99.98/0.01-15/0.01/15, particularly preferably 80-99.8/0.1-10/0.1-10.

The composition of the present invention may be used as a molding material for production of various molded products. In such a case, various fillers such as inorganic powders, glass fibers, carbon fibers, metal oxides or carbon, may be incorporated within a range not to impair the performance. Further, in addition to the fillers, optional additives such as a pigment, an ultraviolet absorber, a surfactant and an antistatic agent, may be incorporated as the case requires.

Now, the present invention will be described in further detail with reference to Examples and Comparative Examples. However, the present invention is by no means thereby restricted. The measuring methods carried out in the respective Examples are as follows.

(1) Melt flow rate (MFR)): MFR as an index of the molecular weight was determined in accordance with the Flow Rate Test Method of ASTM D3159 in such a manner that 5 g of an ETFE sample was extruded at 297° C. with a load of 5 kg (die diameter: 2 mm, length: 8 mm), and the sample extruded for 15 seconds, was sampled and its weight was measured, whereupon the weight was calculated as the extruded amount for 10 minutes, which was taken as MFR (g/10 min).

(2) Melt viscosity: By a Koka model flow tester, 1.5 g of a PPS sample was extruded at 300° C. with a load of 20 kg (die diameter (D): 1 mm, die length (L): 10 mm), whereby the volume flow rate Q (ml/sec) was obtained, and an apparent viscosity was calculated therefrom.

(3) Melting point: By DSC, the endothermic peak in the temperature raising rate of 10° C./min was taken as the melting point.

(4) Flexural strength (unit: $kg/mm^2$): Measured in accordance with ASTM D790.

(5) Tensile elongation (unit: %) Measured in accordance with ASTM D638.

(6) Izod impact strength ($kg-cm/cm^2$): Measured in accordance with ASTM D256.

EXAMPLE 1

79.5 parts by weight of PPS (linear type, melt viscosity: 10800 poise), 20 parts by weight of ETFE (melting point: 230° C., MFR: 45) and 0.5 part by weight of tetrabutylphosphonium bromide were dry-blended and then kneaded by extrusion at an extruding temperature of 330° C. by means of a twin-screw extruder to obtain pellets. The obtained pellets were injection-molded at an injecting temperature of 320° C. at a mold temperature of 140° C. to obtain a molded specimen, whereupon the mechanical properties were measured. The flexural strength, the tensile elongation and the non-notched Izod impact strength were measured, and the results are shown in Table 1.

EXAMPLES 2 to 6

The same test as in Example 1 was carried out except that instead of tetrabutylphosphonium bromide used in Example 1, tetrabutylphosphonium chloride was used in Example 2, and tetrabutylammonium chloride was used in Example 3. Further, the same test as in Example 1 was carried out except that instead of ETFE used in Example 1, ETFE (melting point: 230° C., MFR: 14) was used in Example 4, and ETFE (melting point: 267° C., MFR: 12) was used in Example 5. Further, the same test as in Example 1 was carried out except that instead of PPS used in Example 1, PPS (linear type, melt viscosity: 1160 poise) was used in Example 6. The results are shown in Table 1.

EXAMPLE 7 (COMPARATIVE EXAMPLE)

The same test as in Example 1 was carried out by using only 80 parts by weight of PPS and 20 parts by weight of ETFE as used in Example 1. The results are shown in Table 1.

EXAMPLE 8

The same test as in Example 1 was carried out by using PPS, ETFE and the phosphonium compound as used in Example 1 in amounts of 69.5 parts by weight of PPS, 30 parts by weight of ETFE and 0.5 part by weight of the phosphonium compound.

EXAMPLE 9 (COMPARATIVE EXAMPLE)

The same test was carried out by changing PPS and ETFE used in Example 7 to 70 parts by weight of PPS and 30 parts by weight of ETFE. The results are shown in Table 2.

EXAMPLE 10

78.5 parts by weight of PPS (linear type, melt viscosity: 10800 poise), 20 parts by weight of ETFE (melting point: 230° C., MFR: 45), 0.5 part by weight of tetrabutylphosphonium bromide and 1.0 part by weight of tetraethoxysilane were dry-blended and then kneaded by extrusion at an extruding temperature of 330° C. by means of a twin-screw extruder to obtain pellets. The obtained pellets were injection-molded at an injecting temperature of 320° C. at a mold temperature of 140° C. to obtain a molded specimen. Using this specimen, the mechanical properties were measured. The results are shown in Table 2.

EXAMPLES 11 TO 16

The same test as in Example 10 was carried out except that instead of tetrabutylphosphonium bromide used in Example 10, tetrabutylphosphonium chloride was used in Example 11, and tetrabutylammonium chloride was used in Example 12. Further, the same test as in Example 10 was carried out except that instead of ETFE used in Example 10, ETFE (melting point: 230° C., MFR: 14) was used in Example 13, and ETFE (melting point: 267° C., MFR: 12) was used in Example 14. Further, the same test as in Example 10 was carried out except that instead of PPS used in Example 10, PPS (linear type, melt viscosity: 1160 poise) was used in Example 15, and instead of tetraethoxysilane used in Example 10, -aminopropyltriethoxysilane was used in Example 16. The results are shown in Table 2.

EXAMPLE 17

The same test as in Example 10 was carried out by changing PPS, ETFE, the phosphonium compound and the silane compound used in Example 10 to 68.5 parts by weight of PPS, 30 parts by weight of ETFE, 0.5 part by weight of the phosphonium compound and 1.0 part by weight of the silane compound. The results are shown in Table 2.

TABLE 1

|  | Ex.1 | Ex.2 | Ex.3 | Ex.4 | Ex.5 | Ex.6 | Ex.7 | Ex.8 |
|---|---|---|---|---|---|---|---|---|
| Flexural strength | 14.3 | 14.5 | 13.8 | 13.7 | 13.5 | 13.0 | 12.3 | 12.5 |
| Tensile elongation | 12.8 | 12.5 | 11.7 | 11.8 | 10.5 | 10.2 | 4.8 | 14.3 |
| Izod impact strength | NB | NB | NB | NB | NB | NB | 32 | NB |

NB: Non-breakable

TABLE 2

|  | Ex.9 | Ex.10 | Ex.11 | Ex.12 | Ex.13 | Ex.14 | Ex.15 | Ex.16 | Ex.17 |
|---|---|---|---|---|---|---|---|---|---|
| Flexural strength | 10.5 | 14.1 | 14.1 | 13.4 | 13.2 | 13.8 | 13.1 | 14.0 | 12.4 |
| Tensile elongation | 6.2 | 14.0 | 13.7 | 12.5 | 12.8 | 11.3 | 11.0 | 13.6 | 14.9 |
| Izod impact strength | 46 | NB | NB | NB | NB | NB | NB | NB | NB |

NB: Non-breakable

INDUSTRIAL APPLICABILITY

The composition containing ETFE, PAS and an organic onium compound, is excellent in the mechanical properties.

What is claimed is:

1. A composition which comprises an ethylene-tetrafluoroethylene copolymer and a polyarylene thioether in a weight ratio of 5-95/5-95, and which further comprises an organic onium compound in such a proportion that the weight ratio of the total amount of the above two component polymers and the organic onium compound is 80-99.99/0.01-20.

2. A composition which comprises an ethylene-tetrafluoroethylene copolymer and a polyarylene thioether in a weight ratio of 5-95/5-95, and which further comprises an organic onium compound and an organic silane compound, wherein the weight ratio of the total amount of the above two component polymers, the organic onium compound and the organic silane compound is 70-99.98/0.01-15/0.01-15.

3. The composition according to claim 1, wherein the organic onium compound is an organic ammonium compound or an organic phosphonium compound.

4. The composition according to claim 1, wherein the ethylene-tetrafluoroethylene copolymer is a polymer having ethylene and tetrafluoroethylene copolymerized in a ratio of from 70/30 to 30/70 (mol ratio).

5. The composition according to claim 1, wherein the polyarylene thioether is a polyphenylene sulfide.

6. The composition according to claim 3, wherein the organic ammonium compound is a tetraorganoammonium halide.

7. The composition according to claim 3, wherein the organic phosphonium compound is a tetraorganophosphonium halide.

8. The composition according to claim 2, wherein the organic silane compound is at least one selected from the group consisting of a tetralkoxysilane, an organotrialkoxysilane and a diorganodialkoxy silane.

9. The composition according to claim 6, wherein the tetraorganoammonium halide is selected from the group consisting of tetrabutylammonium chloride, tetrabutylammonium bromide, tetrahexylammonium chloride, tetraheptylammonium chloride and tetrpentylammonium chloride.

10. The composition according to claim 7, wherein the tetraorganophosphonium halide is selected form the group consisting of tributylallylphosphonium chloride, tributylbenzylphosphenium chloride, dibutyldiphenylphosphonium chloride, tetrabutylphosphonium chloride, tetrabutylphosphonium bromide and tributyl (2-methoxypropyl) phosphonium chloride.

11. The composition according to claim 2, wherein the weight ration of the total amount of the two component polymers of ETFF and PPS, the organic onium compound and the organic silane compound is within a range of 70-99.98/0.01-15/0.01/15.

* * * * *